J. C. LEAHAN.
SHOCK ABSORBER FOR AUTOMOBILES.
APPLICATION FILED APR. 17, 1912. RENEWED MAR. 16, 1915.

1,157,165.

Patented Oct. 19, 1915.
2 SHEETS—SHEET 1.

WITNESSES:

INVENTOR.
James C. Leahan,
BY
Utley E. Crane
ATTORNEY.

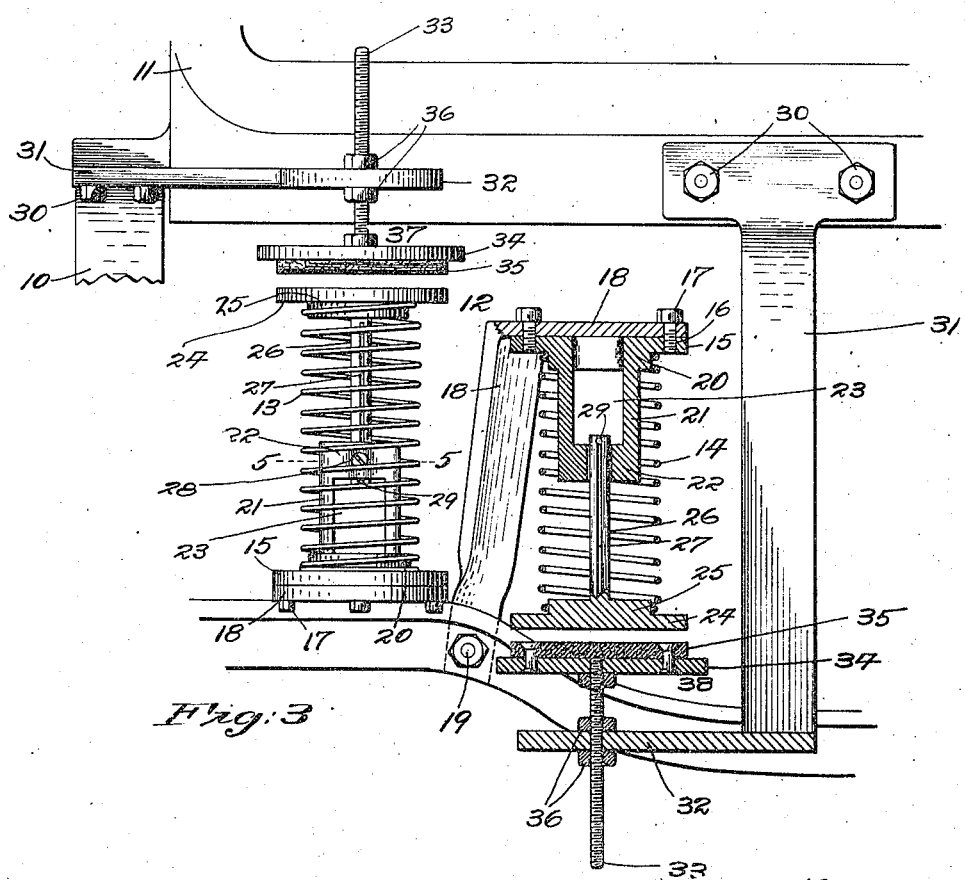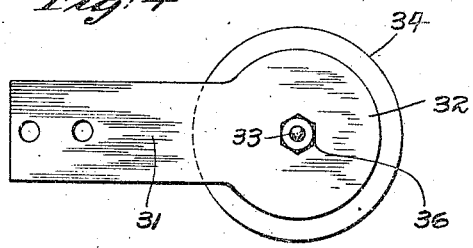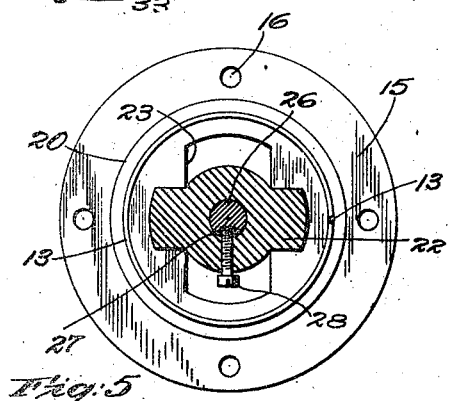

UNITED STATES PATENT OFFICE.

JAMES C. LEAHAN, OF PHILADELPHIA, PENNSYLVANIA.

SHOCK-ABSORBER FOR AUTOMOBILES.

1,157,165.  Specification of Letters Patent.  Patented Oct. 19, 1915.

Application filed April 17, 1912, Serial No. 691,499. Renewed March 16, 1915. Serial No. 14,751.

*To all whom it may concern:*

Be it known that I, JAMES C. LEAHAN, a citizen of the United States, residing at Philadelphia, in the county of Philadelphia and State of Pennsylvania, have invented an Improved Shock-Absorber for Automobiles and other Vehicles, of which the following is a specification.

The principal object of the present invention may be said to reside in the providing of an improved shock absorber for automobiles, of simple, durable, efficient and comparatively inexpensive construction, the parts of which, while being free to contract and expand, are held against lateral and rotary movement.

With these and other objects in view the invention consists of the improvements hereinafter described and finally claimed.

Figure 1:
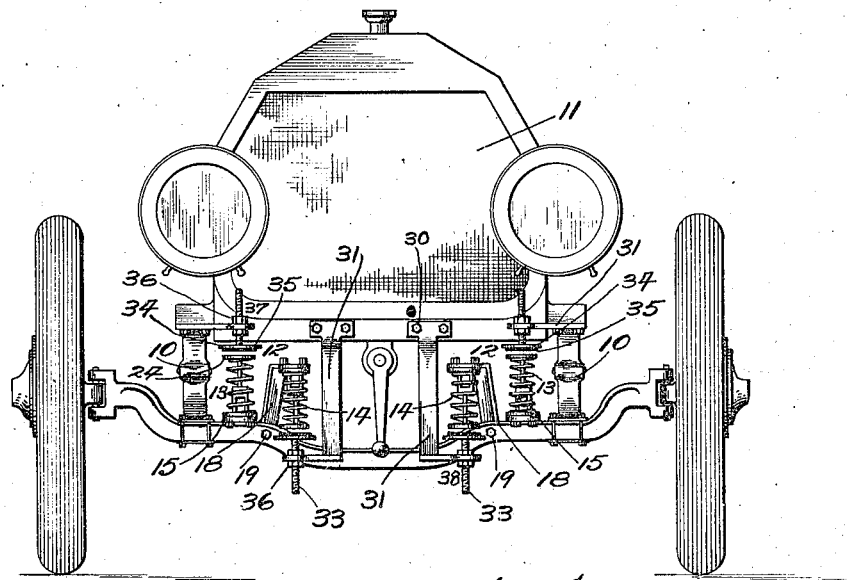
Figure 2:
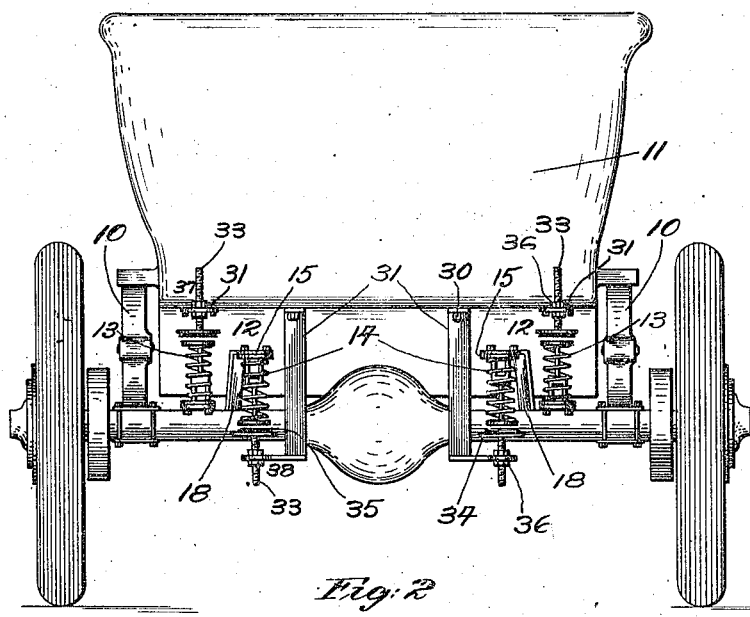

The nature, characteristic features and scope of the invention will be more fully understood from the following description taken in connection with the accompanying drawings forming part hereof and in which:

Figure 1, is a view in front elevation of an automobile equipped with two sets of shock absorbers of the invention, Fig. 2, is a rear view thereof illustrating duplicate sets of shock absorbers as being applied to the rear of the vehicle, Fig. 3, is a fragmentary view drawn to an enlarged scale and partly sectioned illustrating details of construction of the shock absorber, Fig. 4, is a top or plan view of the adjustable tappet member shown at the left hand side of Fig. 3, and Fig. 5, is a view in section taken upon the line 5—5 of Fig. 3, but drawn to an enlarged scale.

In the drawings and referring more particularly to Figs. 1, and 2, the improved shock absorber of the invention is shown as comprising devices arranged in pairs, two pairs being carried by the front of the machine and two pairs carried by the rear of the machine. Thus, each of the compressible springs 10 of the automobile or similar vehicle 11, has arranged adjacent thereto a shock absorber 12. It will thus be observed that each shock absorber 12, comprises a pair of duplicate parts interposed between the axle or other non-vertical movable part of the vehicle and the vertically movable body thereof. As above stated, the parts of each shock absorber 12, are duplicates, with this exception, that the springs of each group, are arranged to act reversely, that is, as the spring 13, is being compressed in the downward movement of the vehicle body, the spring 14, remains inoperative, the said operation being reversed and the spring 14 being adapted to arrest the sudden return of the vehicle spring 10.

Referring now more particularly to Fig. 3, the shock absorber of the invention generally speaking, is made up of a plunger, a guide piece, a cushion interposed therebetween and an adjustable tappet member for co-acting with the plunger. As shown, the guide piece comprises a circular plate 15, apertured as at 16, for the reception of screws, bolts or the like 17, whereby said guide piece may be rigidly secured to a bracket 18, which in turn, is rigidly secured as at 19, to either the front or rear axle or other non-vertical movable part of the vehicle 11. The plate 15, of the guide piece is provided with a concentric portion 20, of smaller diameter than the plate 15, and forming a shoulder. This portion 20, terminates in a pair of standards 21, having an opening 23, therebetween, which parts are bridged by a central apertured cross piece 22. The parts 22, 21, 20, and 15, are preferably formed integral with one another. The plunger parts comprise a circular plate 24, having arranged therewith a concentric portion 25, of smaller diameter which also forms a shoulder. Extended from the part 25, is a stem 26, adapted for vertical passage through the apertured cross piece 22, see Fig. 3. The stem 26, is provided with a keyway 27, and the cross-piece 22, is provided with a set screw 28, which normally engages said key-way, whereby the plunger parts may be free to move vertically with respect to the guide piece but be locked against rotary movement. The free end of the stem 26, is provided with a cross pin 29, in order to prevent the plunger parts being withdrawn from the guide piece. Interposed between the guide piece and plunger parts are the cushions or springs 13, and 14, hereinbefore referred to. In this connection, it may be stated that the shoulders of the parts 20, and 25, hereinbefore referred to form convenient means for accepting the cushions or springs. Rigidly fixed as by means of bolts 30, to the body of the vehicle are arms or brackets 31, terminating in centrally apertured circular plates 32. Passing through each circular plate 32, is a threaded vertically arranged stem 33, carrying at its inner end a disk-like plate 34. The inner face of each plate 34, is preferably provided with a facing of rubber 35. Each plate 34, including its complemental facing 35, may be readily adjusted vertically with respect to its arm or bracket 31, the nuts 36, serving to retain said parts in adjusted position.

In operation as the vehicle springs 10 are compressed, all of the cushions 13, of the various shock absorbers 12, are compressed by the tappet devices 37, said cushions 13, serving to retard the compression of the vehicle springs. During the compression of the vehicle springs 10, and cushions 13, of the shock absorbers, the cushions or springs 14, thereof, relatively speaking remain inoperative in that, the tappet members 38, are caused by the vehicle body to recede from the plunger parts. As the vehicle springs 10, commence to recoil, the cushions or springs 14, of the shock absorbers, serve to arrest the sudden return of the said vehicle springs, because as the vehicle body commences to move upwardly, the tappet members 38, co-act with the plunger parts of the shock absorbers, thereby compressing the cushions 14, with the above result. By virtue of the above described arrangement and construction of parts, the springs or cushions 13, also retain their shape and are not caused to assume or respond to lateral movement, which obviously is advantageous in the art in question. This is true, because the plunger parts working through the guide pieces, assume a vertical movement in contra-distinction from a lateral movement.

What I claim is:

1. A shock absorber for vehicles having compressible springs comprising a pair of reversely operating devices, each device consisting of a fixed guide piece, a plunger working therethrough vertically but locked against lateral and rotary movement with respect thereto, a cushion between the guide piece and plunger, means for rigidly securing said guide piece to a non-vertically movable part of a vehicle, a tappet member for operating the plunger consisting of a support fixed to the vertically movable vehicle body, a stem passing through said support and vertically adjustable through the same and means for clamping said stem in adjusted position, whereby when the vehicle springs are compressed one of said devices will operate to retard such compression and reversely the other device will serve to prevent the sudden return of said vehicle springs.

2. A shock absorber for vehicles having compressible springs comprising a pair of reversely operating devices, each device consisting of a fixed guide piece, a plunger having a plate at one end said plunger working vertically through said guide piece but locked against lateral and rotary movement with respect thereto, a cushion between the guide piece and the plate of the plunger, means for rigidly securing said guide piece to a non-vertically movable part of a vehicle, a tappet member for operating said plunger consisting of a support fixed to the vertically movable vehicle body, a vertically disposed adjustable stem terminating in a plate for abutting against the plunger plate, means for clamping said stem in adjusted position and a pliable facing for one of said plates, whereby when the vehicle springs are compressed one of said devices will operate to retard such compression and reversely the other device will serve to prevent the sudden return of said vehicle springs.

3. A shock absorber for vehicles having compressible springs comprising a pair of reversely operating devices each device consisting of a fixed guide piece, a plunger working therethrough vertically but locked against lateral and rotary movement with respect thereto, a cushion between the guide piece and plunger means for rigidly securing said guide piece to a non-vertical movable part of a vehicle, a tappet member for operating the plunger consisting of a support fixed to the vertically movable vehicle body, a screw-threaded stem adjustable vertically through said support and lock nuts for holding the screw-threaded stem in adjusted position, whereby when the vehicle springs are compressed one of said devices will operate to retard such compression and reversely the other device will serve to prevent the sudden return of said vehicle springs.

In testimony whereof, I have hereunto signed my name.

JAMES C. LEAHAN.

Witnesses:
LIONEL TELLER SCHLESINGER,
UTLEY E. CRANE.